United States Patent [19]
Bakker

[11] 3,943,216
[45] Mar. 9, 1976

[54] PRODUCTION OF PERICLASE REFRACTORY UTILIZING ALKYD RESINS

[75] Inventor: Wate Thewis Bakker, Anne Arundel County, Md.

[73] Assignee: General Refractories Company, Bala Cynwyd, Pa.

[22] Filed: Jan. 7, 1974

[21] Appl. No.: 431,558

[52] U.S. Cl. .................. 264/56; 106/38.7; 264/30; 264/63
[51] Int. Cl.² ........................................ C04B 35/04
[58] Field of Search ............... 264/63, 56; 106/38.7; 260/40 R, 22 A, 22 CB

[56] References Cited
UNITED STATES PATENTS

| | | | |
|---|---|---|---|
| 1,616,055 | 2/1927 | Marks | 264/56 |
| 2,148,642 | 2/1939 | Ricard | 106/38.7 |
| 2,606,161 | 8/1952 | Marling | 260/22 CB |
| 2,628,209 | 2/1953 | Fisk | 260/22 CB |
| 3,008,847 | 11/1961 | LaBerge | 260/40 R |
| 3,255,500 | 6/1966 | Engel et al. | 106/38.7 |
| 3,445,410 | 5/1969 | Coulter | 260/22 A |

OTHER PUBLICATIONS
Marr and Treffner, "Microstructure of Periclase and Carbon in BOF Refractories," Ceramic Bulletin, Vol. 51, No. 7 (1972), pp. 582–586.

*Primary Examiner*—Donald J. Arnold
*Assistant Examiner*—John Parrish
*Attorney, Agent, or Firm*—Everett H. Murray, Jr.; Brian G. Brunsvold; Herbert H. Mintz

[57] ABSTRACT

Improved periclase refractories are prepared by using an alkyd resin binder for tempering and pressing periclase grains into refractory shapes such as bricks. The pressed shapes are dried and fired. After firing, the refractory shapes are impregnated under vacuum with molten pitch and can then be used as lining in basic oxygen steelmaking furnaces. The fired refractory bricks have a greatly improved modulus of rupture at 1482°C. of 3000–4000 p.s.i. The alkyd resin is generally incorporated in amounts of 2.5 to 4.5 weight percent.

The green strength of the alkyd resin bonded bricks can be improved by adding a strong organic acid to the alkyd resin prior to mixing it with periclase grains. The green strength of bricks produced from such a mixture is between 30 and 40 p.s.i.

14 Claims, No Drawings

PRODUCTION OF PERICLASE REFRACTORY UTILIZING ALKYD RESINS

FIELD OF THE INVENTION

This invention relates to improved periclase refractory shapes and their method of manufacture. More particularly, this invention relates to periclase refractories that are especially useful in basic oxygen steelmaking vessels and the process of making these refractories.

BACKGROUND OF THE INVENTION

Furnaces used in the basic oxygen steelmaking process are usually provided with a refractory lining which frequently consists of bricks formed from magnesia, or dolomite, or mixtures of magnesia and dolomite. These refractory bricks can be used in a burned or unburned condition and are often tar impregnated or tar-bonded. Tar-bonded bricks are generally made by first mixing refractory grains of dolomite or magnesia with pitch or tar and then pressing the mixture to shape, and are usually used in an unburned or unfired condition. On the other hand, tar-impregnated refractory bricks are generally prepared by mixing refractory magnesia particles with a suitable binder, pressing the mixture to shape, drying the shape, firing the refractory shape, and then impregnating the fired shape with pitch.

Refractory magnesia (MgO) is made by "dead burning" the mineral magnesite ($MgCO_3$), or such magnesium compounds as the hydrate or the chloride, to obtain a residual dense grain of magnesium oxide of stable character. The term dead burning as used in relation to magnesite denotes a procedure in which magnesite is heated to from about 1600° to 2300° C. Dead-burned magnesite is often referred to as "periclase" which denotes a composition having a very high percentage of MgO and which has been processed as by dead burning.

For example, commercially available refractory magnesia now commonly analyzes 96 to 99+ percent MgO, and less than 1.5 percent by weight silica on an oxide basis.

In the past, burned refractory magnesia bricks have usually been produced from dead-burned magnesite (periclase) containing about 96% MgO and having a $CaO/SiO_2$ ratio ranging from 1.5 to 2.5. Specifically graded size fractions of the periclase, including fine fractions and coarse fractions, are mixed together in conventional mixing equipment such as a muller mixer to provide a dry mix which will produce an optimum packed density. An appropriate binder composition is then added in predetermined proportions to the dry mix and is blended or tempered with the mix to wet out all the grains and provide an easily pressed mixture. These binder compositions usually consist of small amounts of water and a binder material or materials. Typical binder materials that have been used for producing tar-impregnated brick include lignosulfonates, magnesium sulphate, sulfuric acid, dextrin, and the like, with lignosulfonates being generally preferred.

The blended mixture of preiclase and binder is pressed in a mold by a mechanical or hydraulic press under a pressure in excess of 5,000 p.s.i. and preferably about 10,000 to 20,000 p.s.i. This pressed or molded shape is known as a green brick and typically ranges in length from 18 to 27 inches. The green brick is then dried in a suitable manner, such as for example, in an oven at a temperature in the range of about 110° to 204° C. and preferably about 121° to 177° C. to allow the lignosulfonate bond to harden. After mixing, pressing and drying, the refractory shapes are fired in a kiln at maturing temperatures usually in excess of at least about 1538° C. Generally and preferably, such firing will be conducted at a maturing temperature in the range of about 1593° to 1760° C. After firing, the brick is impregnated with pitch under vacuum at about 232° C. The pitch-impregnated brick usually contains about 5 to 6% pitch, of which about 2.1 to 2.6% is retained as carbon after coking.

Refractory linings employed in basic oxygen process steelmaking furnaces must have sufficient strength to support the charge of molten metal in the vessel. Tar-impregnated magnesia refractory bricks produced by the conventional method just described, however, typically have a density of about 2.93 to 3.02 g/cc and a hot modulus of rupture at 1482° C. of about 1000 p.s.i. Bricks of greater strength are desired for use in basic oxygen process steelmaking furnaces. The prior art has employed a variety of techniques, such as refinements in composition and mineral placement, to produce refractory magnesia bricks having a hot modulus of rupture at 1482° C. of between about 1500 to 2400 p.s.i. For example, as disclosed in U.S. patent application Ser. No. 16,237 by Treffner and Filer, filed Mar. 3, 1970, now abandoned, and assigned to the same assignee as the present invention, an improved modulus of rupture at 1482° C. can be obtained by adjusting the $CaO/SiO_2$ ratio of the fine fractions to 1.6 – 2.1 while the $CaO/SiO_2$ ratio of the coarse fractions is preferably maintained at 2.0 or higher. The 1482° C. modulus of rupture of brick produced by this method is about 2000 p.s.i., but still greater improvements would be extremely useful in providing refractory linings that can better withstand the conditions that are encountered in the basic oxygen steelmaking furnaces.

The green strength of commercially made lignosulfonate-water bonded periclase brick, that is, the transverse strength of the brick after it is pressed but before it is dried or fired, is relatively low, having a room temperature modulus of rupture of between 10–15 p.s.i. This relatively low green strength causes a serious problem in the handling of shapes longer than 20 inches because when these shapes are lifted by their end, the transverse stresses in the brick generated by their own weight are often sufficient to break the shape in half. Accordingly, a large amount of green brick breakage usually occurs when producing bricks of over 20 inches in length, and a substantial amount of breakage occurs even with smaller bricks. Minimum off-press transverse strength required to prevent breakage has been calculated for shapes with varying lengths as follows:

| Largest Dimension of Brick | Minimum M.O.R.(p.s.i.) of Green Brick Required for Safe Handling |
|---|---|
| 15" | 6.5 |
| 18" | 9.0 |
| 20" | 13.5 |
| 24" | 17.0 |
| 27" | 23.0 |

Accordingly, it would be desirable to improve the green strength of periclase brick to decrease breakage and lower manufacturing cost while at the same time producing a green brick which can be fired and provide a high hot modulus of rupture.

SUMMARY OF THE INVENTION

It has now been found, in accordance with the present invention, that improved fired periclase refractory shapes can be produced by mixing refractory periclase grain with about between 2.5 and 4.5 weight percent of an alkyd resin, based on the weight of the grain, to form a refractory batch, tempering the batch, pressing the batch into green refractory shapes, drying the green shapes, and firing the dried shapes.

It has been found that fired refractory shapes produced in accordance with this method have a significantly higher hot modulus of rupture at 1482° C. than conventionally produced prior art shapes, and more particularly have a hot modulus of rupture at 1482° C in excess of 3000 p.s.i. and usually between about 3000 to 4000 p.s.i. Other properties of the fired brick such as the hot crushing strength and density are also improved as compared to conventionally produced brick.

Thus, the present invention provides an improved fired periclase refractory shape comprising sized magnesia grain, bonded by about 2.5 to 4.5 weight percent of an alkyd resin, based on the weight of the grain, and having a hot modulus of rupture at 1482° C. greater than 3000 p.s.i.

After firing, the refractory shapes can be pitch-impregnated in accordance with conventional procedure. The pitch-impregnated fired bricks maintain the same excellent physical properties as the unimpregnated brick.

The green strength of the unfired and undried refractory shape produced by using an alkyd resin in accordance with the teachings of this invention is relatively low and about comparable to the green strength of conventionally produced lignosulfonate-water bonded brick.

Accordingly, in another aspect of the present invention, it has been found that periclase refractories having improved green strength can be produced by tempering a dry brick batch of graded magnesia grains with 2.5 to 4.5% alkyd resin and between about 0.1 and 1.5% of a strong acid, based on the weight of the grain, and then pressing the tempered batch to shape. Preferably, the acid is a strong organic acid such as toluene sulphonic acid. The green strength of brick produced in accordance with this aspect of the invention is between about 30 and 40 p.s.i., and is more than sufficient to enable handling of the green brick without breakage. When this green brick is subsequently fired, the resulting fired brick retains the high hot modulus of rupture of brick containing alkyd resin alone.

The present invention thus provides an improved binder composition for producing periclase refractories, which consists essentially of an alkyd resin and about 5% to about 35% of a strong acid, preferably a strong organic acid, based on the weight of the resin. This binder composition produces a green brick comprised of periclase grains containing the reaction product of 2.5 to 4.5% alkyd resin and 0.1 to 1.5% acid, based on the weight of the grain, and having a green strength of about 30 p.s.i.

The present invention consists of the processes, compositions, articles, combinations and improvement set forth herein and in the appended claims.

It is to be understood that both the foregoing general description and the following detailed descriptions are exemplary and explanatory, but are not restrictive of the invention.

DETAILED DESCRIPTION OF THE INVENTION

The refractory bricks and shapes of the present invention are prepared from refractory magnesia grains which are usually obtained from a dead-burned magnesite, but which can be obtained from any other source of magnesia. The magnesite should be relatively pure with respect to silicate content. A typical dead-burned magnesite which is suitable for use in the present invention has a bulk specific gravity of 3.37 and the following chemical analysis given in terms of weight percent:

| | |
|---|---|
| MgO | 95.5 – 96.5 |
| CaO | 2.4 |
| $SiO_2$ | 1.2 |
| $Fe_2O_3$ | 0.24 |
| $Al_2O_3$ | 0.20 |
| $B_2O_3$ | 0.024 |

To produce the refractory compositions of the present invention, and as well known in the art, the magnesia grain is crushed and sized in various fractions. Commonly used grain sizes of refractory magnesia may be used to produce a dry mix for maanufacturing the bricks of this invention. Refactory articles useful in basic oxygen process furnaces desirably should have a low porosity and maximum bulk density, and the sizes of the refractory aggregates should be selected to achieve these results. Techniques of selecting grain size to accomplish this end, by employing combinations of relatively coarse and relatively fine refractory aggregates are well-known in the art. A typical mixture of coarse, intermediate and fine grain fractions suitable to achieve hig bulk density and low porosity, using Tyler standard screen sizes, is as follows:

30 to 35% passing 4 mesh and retained on 10 mesh
30 to 40% passing 6 mesh and retained on 28 mesh
30 to 35% ball mill fines (less than 100 mesh)

Preferably, and in accordance with the teachings of the abovereferred application Ser. No. 16,237, the chemical composition of the ball mill fines is adjusted to provide a $CaO/SiO_2$ ratio for the ball mill fines of 1.4 to 2.0, preferably 1.6. This ratio can be obtained by adding siliceous periclase fines or finely divided silica together with $CaCO_3$ or $Ca(OH)_2$ powder.

The various grain-size fractions are blended dry in a suitable mixer, commonly used in the refractory industry such as a muller mixer. Generally, one minute of dry mixing is sufficient to provide a homogeneous mixture.

In accordance with the invention, 2.5 to 4.5% of alkyd resin is mixed with the refractory magnesia grain. An alkyd resin is the resinous reaction product of a polyhydric alcohol and polybasic acid, usually a dibasic acid. The alkyd resins that are preferably used in the present invention are the resinous reaction products obtained by polymerizing a polyhydric alcohol, a dibasic acid, and a monobasic fatty acid, and are well known in the art for their use in oil-base paints. The monobasic fatty acid is commonly supplied in the form of a triglyceride or oil, and the alkyd resins obtained thereby are commonly referred to as oil-modified alkyds.

Polybasic acids that can be used to prepare the alkyd resins useful in the present invention are those that are commonly employed in the art and include phthalic anhydride, isophthalic acid, maleic anhydride, fumaric acid, azelaic acid, succinic acid, adipic acid and sebacic acid. Preferably, phthalic anhydride is used to prepared the resins useful in the present invention.

Polyhydric alcohols that can be used to prepare the alkyds useful in the present invention are those commonly employed in the art and include glycerol, pentaerythritol, dipentaerythritol, trimethylolethane, sorbitol, ethylene glycol, propylene glycol, dipropylene glycol, trimethylolpropane, neopentylene glycol (2,2-dimethyl-1, 3-propanediol), etc. Glycerol is the preferred polyhydric alcohol for use in the present invention.

The monobasic fatty acid that can be used to prepare the alkyd resins are obtained from oils including tung, linseed, soybean, peanut, dehydrated castor, fish, safflower, oiticica, cottonseed, and coconut oil. Soybean and linseed oils are preferred with respect to the alkyds useful in the present invention.

Various combinations of dibasic acids, polyhydric alcohols and monobasic fatty acids can be used to prepare alkyd resins of different viscosity and hardening properties. Generally, the viscosity of the resin mixture prepared from phthalic anhydride and glycerol is determined by the alkyd number of the resin, i.e., the percentage of phthalic anhydride and glycerol contained in the mixture. Thus, a resin with an alkyd number of 0 consists only of glycerol and phthalic anhydride. This material is a hard brittle substance and is not useful in the present invention. Similarly, a resin with an alkyd number of 0 consists only of oil, and is not useful in the present invention as it has a generally low viscosity. Resins of the greatest practical use in the present invention have alkyd numbers in the 15 – 65 range. The viscosity of the resin can further be modified by the addition of organic solvents, such as mineral spirits, although other hydrocarbons, including aromatic hydrocarbons such as xylene can also be used.

Alkyd resins which have proven especially usful in the present invention contain 70 – 80% resin, 30 – 20% solvent, and have an alkyd number of 15 – 40. These materials are known in the art as medium to long alkyd resins. Short alkyd resins are also useful in the present invention, but they are difficult to disperse in the dry ingredients of the refractory batch because of their high viscosity.

A specific alkyd resin which has been found to be suitable in the present invention is available under the tradename Aroplaz 1266-M70 sold by Ashland Chemical Co., a division of Ashland Oil Co., and has a viscosity range of 2000 to 4000 cp. This alkyd resin contains 70% resin, 30% mineral spirits and is prepared from a resin mixture containing 63% soybean oil, 25% phthalic anhydride, and remainder essentially glycerol.

The alkyd resin binder is preferably added to the dry mix of magnesia grains immediately after the blending of the various grain-size fractions is completed. The amount of alkyd resin added is between about 2.5 and about 4.5 weight percent, based on the weight of the grain. Normally, about 3 – 4% alkyd resin is sufficient to wet out all the grains properly and provide an easily pressed mix.

In accordance with the invention, the mixture of magnesia grain and alkyd resin is tempered. The magnesia grain and alkyd resin are tempered, that is, they are blended together in the mixer to provide a mix where all the magnesia grains are wetted to enable subsequent pressing of the mix to shape to be easily accomplished. A minimum of 5 minutes, but preferably 10 – 15 minutes, mixing is required to provide a mixture that can be satisfactorily pressed.

In accordance with the invention, the tempered mix containing the alkyd resin binder is pressed into shapes. The pressing step of this invention is conducted in accordance with conventional pressing techniques well known in the art and can be carried out by using conventional mechanical (toggle), hydraulic or impact presses. Generally, a pressure of 10,000 – 18,000 p.s.i. is used to obtain strong shapes.

In accordance with the invention, the pressed shapes are dried. The pressed shapes can be dried at a minimum temperature of 100° C. to a temperature of about 288° C. but preferably a temperature of about 200° C. is used. Drying of the bricks hardens the bricks and prepares them for subsequent firing. The drying step of this invention is conducted in accordance with conventional drying techniques.

In accordance with the invention, the dried shapes are fired. Preferably, the dried shapes are burned in a tunnel of a periodic kiln at a temperature range of about 1538° – 1760° C., but preferably a temperature range of about 1593° – 1733° C. The burning step of this invention is conducted in accordance with conventional burning techniques.

Refractories prepared according to the process of the present invention, after firing but before impregnation with pitch have a density of about 2.97 – 3.06 g/cc and a hot modulus of rupture of 3000 – 4000 p.s.i. at about 1482° C., and 2000 – 3000 p.s.i. at 1600° C. In comparison, similar brick made with a conventional lignosulfonate binder have a density of 2.92 – 3.03 g/cc and a hot modulus of rupture of 1600 to 2500 p.s.i. at about 1482° C and 1200 to 1900 p.s.i. at 1600° C.

After burning, the refractories of the present invention can be impregnated under vacuum with molten pitch, when intended for use in basic oxygen steel making vessels. The pitch impregnation is conducted in accordance with conventional techniques, for example, by impregnating the refractory with about 5 to 6% pitch under vacuum at about 177° to 260°C, preferably 232°C.

In accordance with a preferred embodiment of the invention, a strong acid is used along with the alkyd resin when the dry batch of refractory grains is tempered. The green strength of refractory shapes prepared from a tempered batch of refractory grain and alkyd resin is relatively low. A dry refractory batch which has been tempered with alkyd resin and a strong acid will provide unfired bricks with greatly increased green strength, that is, a green strength of at least 30 p.s.i. Depending on the process conditions, the green strength achieved generally will be from about 30 – 40 p.s.i., and in some instances can be as high as about 50 p.s.i. These higher green strengths are sufficient to permit handling the brick in the green state without significant amounts of breakage.

The acid used is preferably a strong organic acid, although strong inorganic acids can also be used. Exemplary of suitable strong organic acids that can be used are toluene sulfonic acid, xylene sulfonic acid, mixtures of different sulphonic acids such as xylo sulphonic and toluene sulphonic acid, salycylic acid, trichloracetic acid, and the like. Typical inorganic acids that can be used include $H_2SO_4$, HCL, $H_3PO_4$ and the like.

The strong acid can be added to the dry brick batch separately from the alkyd resin, or more preferably can be premixed with the alkyd resin and added to the dry brick batch together with the alkyd resin. The acid greatly increases the viscosity of the alkyd resin and therefore it is preferred to mix the alkyd resin with the dry brick batch as soon as the acid is added to the resin. A convenient method of achieving this immediate addition of acid and resin to the dry brick batch is to add the acid to the resin while the resin is being poured into the dry brick batch, but before the resin comes into contact with the dry brick batch.

The present invention thus provides a novel binder system for the production of periclase refractories which consists of an alkyd resin and a strong acid. The binder system is effective to markedly increase the green strength of the periclase refractory. The strong acid usually comprises from about 5 to about 35% of the weight of the alkyd resin, and more preferably between about 10 to 20% by weight of the resin. Thus, refractory compositions prepared from this binder system usually contain from 2.5 to 4.5% alkyd resin and from 0.1 to 1.5% of strong acid.

After addition of the alkyd resin and strong acid, the mix is then further processed as described above. Thus, the mix is tempered, pressed to shape, dried, and fired to produce a fired refractory shape such as a brick which can then be tar impregnated. Maximum green strength of the refractory composition is usually achieved by allowing the tempered batch to air dry for up to about 1 hour before the composition is pressed into shape. The green strength of the pressed shaped generally increases with increasing air-drying time of the tempered batch, while the green density of the pressed shape is not significantly decreased by holding the tempered batch for at least one hour prior to pressing. In commercial practice, most batches are used within one hour after tempering. Thus, the binder composition of the present invention is ideally suited for commercial use.

Bricks and other refractory shapes produced with a binder of alkyd resin and strong acid exhibit the same degree of improvement in high hot strength as exhibited by brick produced with alkyd resin without the use of a strong acid.

The following examples are given by way of illustration to further explain the principles of the invention. These examples are merely illustrative and are not to be understood as limiting the scope and underlying principles of the invention in any way. All percentages and parts referred to herein are by weight unless otherwise specifically indicated.

EXAMPLE 1

Periclase refractories are prepared in a laboratory from 96% MgO periclase grains. The grains are crushed and sized in accordance with the following size distribution:

| Tyler Screen Size | % of Refractory Composition |
|---|---|
| −4+10 Mesh | 40.0 |
| −10+20 Mesh | 10.0 |
| −20+48 Mesh | 8.0 |
| −48 Mesh | 7.0 |
| Ball Mill Fines | |
| Ground to 60% −325 Mesh | 10.0 |
| Ground to 95% −325 Mesh | 25.0 |

Two refractory batches are prepared from the above-described material. In one batch, 3% of a 50% lignosulfonate solution in water and 2% additional water are used as binders. In the other batch, 4.0% of a long alkyd resin is uded as a binder. The alkyd resin is prepared mainly from phthalic anhydride, glycerol, soybean oil, and contains 70% resin and 30% of mineral spirits solvent. The alkyd resin used is obtained commercially under the name Aroplaz 1285 from Ashland Chemical Co., division of Ashland Oil Co., and comprises a mixture of various long oil alkyds, with the main alkyd resin in the mixture being Aroplaz 1266-M-70 previously described above in detail.

Each brick batch is processed into 9×4½×3inches brick by first dry blending the sized grain in a muller mixer for 1 minute and then adding the alkyd resin to the sized grains. The mixture of resin and grain is blended for 10 minutes to wet all of the grains with resin and form a shapeable mixture. After blending, the mix is pressed at 15,000 p.s.i. using a hydraulic press. The green brick is dried at 230° F. (110°C.) for 18 hours. A first set of brick from each batch is fired at 1677° C. and a second set is fired at 1719° C. in a commercial tunnel kiln. After burning, brick with the following properties are obtained:

TABLE 1

| | Batch 1 | Batch 2 |
|---|---|---|
| Binder | Lignosulfonate + Water (Conventional Binder) | Alkyd Resin (Improved Binder) |
| Properties after 1677°C Burn: | | |
| Density, g/cc | 2.94 | 3.06 |
| Modulus of Rupture, at 1482°C, p.s.i. | 1760 | 3330 |
| Hot Crushing Strength, at 1538°C, p.s.i. | 3530 | 4860+* |
| Properties after 1719°C Burn: | | |
| Density, g/cc | 2.97 | 3.06 |
| Modulus of Rupture at 1482°C, p.s.i. | 2330 | 3870 |

*Samples did not break during test.

These results clearly show that an increase in density and hot strength is obtained by using an alkyd resin binder in accordance with the present invention instead of the conventional lignosulfonate-water binder system.

EXAMPLE 2

A mix having the same composition as in Example 1 is processed into 9×4½×3 inches brick using the identical procedure of Example 1 , except that lower amouonts of alkyd resin are used. Two brick batches are prepared, one using 3.5% alkyd resin and the other using 3.75% alkyd resin.

Table II shows the physical properties of the resulting brick after burning at 1719° C.

TABLE II

Properties of Alkyd Resin Bonded Brick After 3125°F Burn

| | Batch 3 | Batch 4 |
|---|---|---|
| % Alkyd Resin Used | 3.5 | 3.75 |

TABLE II-continued

Properties of Alkyd Resin Bonded Brick After 3125°F Burn

| Properties | Batch 3 | Batch 4 |
|---|---|---|
| Bulk Density, g/cc | 3.00 | 3.02 |
| Hot Modulus of Rupture, p.s.i. at 1482°C | 2780 | 3240 |
| Hot Crushing Strength, p.s.i. at 1538°C | 5000+* | 5000+* |

*Specimens did not fail at maximum load.

The results indicate that improved hot strength is also obtained when, as shown in Table II, a lower alkyd resin content than 4% is used, although the hot strength is not as high as in Batch 2 of Example 1 where 4% alkyd is used.

EXAMPLE 3

Periclase refractories are manufactured on a commercial scale using 96% MgO periclase grains. The grain sizings of the refractory is as follows:

| Tyler Screen Size | % of Refractory Composition |
|---|---|
| −4+10 Mesh | 32.5 |
| −6+28 Mesh | 35.0 |
| Ball Mill Fines Ground to 60% −325 Mesh | 32.5 |

Two 1800 pound refractory batches are prepared. In one batch (Batch 5), 3% of a 50% lignosulfonate solution in water and approximately 1% additional water is used as a green binder. In the other batch (Batch 6), 3.5% alkyd resin is used as a binder. EAch batch is mixed and tempered in muller mixer for 10 minutes and pressed into 18×6-5×3inches key-shaped refratories for use in a basic oxygen furnace (B.O.F.) vessel. The brick is dried at 149°C in a tunnel drier and fired in a tunnel kiln at 1719°C. Table III below gives the properties of the brick after burning and impregnation with pitch.

TABLE III

| | Batch 5 | Batch 6 |
|---|---|---|
| Brick Size: | 18×6-5×3″ | 18×6-5×3″ |
| Binder, % | 3.0 Lignosulfonate | 3.5 Alkyd Resin |
| Bulk Density, g/cc | | |
| Impr. | 3.15 | 3.16 |
| Coked | 3.04 | 3.07 |
| Ignited | 3.03 | 3.04 |
| Open Porosity, % | | |
| Ignited | 12.5 | 11.2 |
| **Modulus of Rupture, p.s.i. *** | | |
| Room Temperature | 2680 | 3120 |
| At 1482°C | 2370 | 3050 |
| At 1593°C | 1890 | 2380 |
| **Crushing Strength*, p.s.i.** | | |
| Room Temperature | 8550 | 9490 |
| At 1538°C | 5000+ | 5000+ |
| Total Pitch Content, % | 5.3 | 5.1 |
| Volatiles, % | 3.2 | 3.0 |
| Retained Carbon, after coking % | 2.1 | 2.1 |
| Carbon Yield, % | 40.0 | 41.0 |

*Before Impregnation

The data of Table III clearly demonstrates that the superior hot strength of alkyd resin bonded brick is maintained during commercial production.

EXAMPLE 4

This example illustrates the use of a strong organic acid to improve the green strength of a pressed brick.

Four brick batches (Batches 7, 8, 9, and 10) having a grain sizing as shown below are prepared from 96% MgO periclase.

| Tyler Screen Size | % of Refractory Composition |
|---|---|
| −4+10 Mesh | 32.5% |
| −6+28 Mesh | 35.0% |
| Ball Mill Fines Ground to 60% −325 Mesh | 32.5% |

Each brick batch has added to it a mixture of (a) a long alkyd resin and (b) a mixture of various sulfonic acids mainly toluene and xylosulphonic acid, in the amounts shown below in Table IV. The long alkyd resin used is Aroplaz 1285 described in Example 1 above. The mixture of sulfonic acids is sold by Nease Chemical Co., State College, Pa., under the name MOD acid. A first portion of each brick batch is mixed and tempered for 10 minutes and 9×4½×3 inches brick are pressed on a hydraulic press at 15,000 p.s.i. The transverse or green strength of the pressed brick is then determined.

A second portion of each brick batch is tempered for 5 minutes longer than the first portion (for a total of 15 minutes), and 9×4½×3 inches brick are pressed on a hydraulic press at 15,000 p.s.i. The transverse strength of the pressed brick from the second portion is then determined. Three additional portions of each brick batch are tempered for 15 minutes and then allowed to air-dry for 30, 45 and 60 minutes, respectively, to determine the shelf life of the tempered mix. The air-dried batches are then pressed into brick and the transverse strength of the green brick is determined. The results for the various batches and tests are shown in Table IV.

TABLE IV

Effect of Acid Addition to Alkyd Resin on the Off-Press Strength of Alkyd Resin Bonded 96% MgO Refractories

| | Batch 7 | Batch 8 | Batch 9 | Batch 10 |
|---|---|---|---|---|
| Alkyd Resin, | | | | |
| % of Mix Comp. | 3.6 | 3.6 | 3.3 | 3.0 |
| MOD Acid | | | | |
| % of Mix Comp. | 0.2 | 0.4 | 0.7 | 0.6 |
| % of Alkyd Resin | 5.5 | 11.0 | 21.0 | 20.0 |
| Transverse Strength, Psi After | | | | |
| 10 Min. Mixing | 21.0 | 28.0 | 34.0 | 32.0 |
| 15 Min. Mixing | 23.0 | 29.0 | 32.0 | — |
| 30 Min. Holding | 26.0 | 29.0 | 35.0 | — |
| 45 Min. Holding | 25.0 | 41.0 | — | 43.0 |
| 60 Min. Holding | 35.0 | 43.0 | — | — |
| Green Density g/cc After | | | | |
| 10 Min. Mixing | 3.03 | 3.04 | 3.06 | 3.06 |
| 15 Min. Mixing | 3.05 | 3.06 | 3.08 | — |
| 30 Min. Holding | 3.05 | 3.06 | 3.08 | — |
| 45 Min. Holding | 3.06 | 3.06 | — | 3.05 |
| 60 Min. Holding | 3.06 | 3.04 | — | — |

The data of Table IV shows that the off-press strength of the brick increases with increasing storage time, while the off-press density does not significantly decrease for at least one hour after tempering. As most batches in a commercial operation are used within 30 minutes after tempering, it is concluded that the alkyd resin-acid bonding system is suitable for commercial production.

After pressing, the 1482°C hot modulus of rupture (M.O.R.) is determined for each brick. The 1482°C hot M.O.R. of the various bricks is in the range of 3000–3800 p.s.i. and indicate that the brick has the same high hot strength as alkyd resin bonded brick without the acid additive.

The invention in its broader aspects is not limited to the specific details shown and described, and departures may be made from such details without departing from the principles of the invention and without sacrificing its chief advantages.

What is claimed is:

1. A process for improved fired periclase refractories comprising mixing refractory periclase grain with 2.5 to 4.5% of alkyd resin, based on the weight of the grain, to form a refractory batch capable of being pressed into refractory shapes, pressing the batch into green refractory shapes aat a pressure of from 8,000 to 20,000 p.s.i., drying the green shapes at a temperature of from 100° to 288°C, and firing the dried shapes at a firing temperature of from 1538° to 1760°C.

2. The process of claim 1 wherein the firing temperature is in the range of about 1593° to 1733°C.

3. The process of claim 1 wherein the alkyd resin has an alkyd number of from 15 to 65.

4. The process of claim 3 wherein the alkyd resin is formed from a polyhydric alcohol selected from the group of glycerol, pentaerythritol, dipentaerythritol, trimethylolethane, sorbitol, ethylene glycol, propylene glycol, dipropylene glycol, trimethylolpropane, and neopentylene glycol; a dibasic acid selected from the group of phthalic anhydride, isophthalic acid, maleic anyhydride, fumaric acid, azelaic acid, succinic acid, adipic acid, and sebacic acid; and an oil selected from the group of tung oil, soybean oil, linseed oil, cottonseed oil, peanut oil, dehydrated castor oil, fish oil, safflower oil, oiticica oil, and coconut oil.

5. The process of claim 1 wherein the amount of resin is between 3.0% and 4.0%.

6. The process of claim 1 wherein the mixing step includes blending the periclase grain and alkyd resin for from 5 to 15 minutes.

7. The process of claim 1 wherein the refractory batch further includes 0.1 - 1.5% of a strong acid, based on the weight of the grain.

8. The process of claim 7 wherein the strong acid is a strong organic acid.

9. The process of claim 8 wherein the strong organic acid is selected from the group consisting of toluene sulfonic acid, xylo sulphonic acid, mixtures of sulphonic acids, salycylic acid, and trichloracetic acid.

10. The process of claim 1 wherein a $CaO/SiO_2$ ratio of from about 1.5 – 2.5 is provided for the batch.

11. The process of claim 1 wherein the alkyd resin is a fatty oil modified alkyd resin.

12. A process for producing improved periclase refractories suitable for use in basic oxygen steelmaking furnaces, the process comprising grinding, crushing and sizing periclase grains to obtain a dense packing mixture; mixing the sized refractory grain mixture with 2.5 – 4.5% alkyd resin, based on the weight of the grain, to form a batch; blending the batch for 5 to 15 minutes in a mixer; pressing the blended batch into green refractory shapes at 8,000 to 20,000 p.s.i.; drying the green shapes at 100° to 288°C; and firing the dried shapes at 1538° to 1760°C.

13. The process of claim 12 wherein the alkyd resin has an alkyd number of about 15 to 40 and the amount of resin is between about 3.0% and 4%.

14. The process of claim 12 wherein 0.1 to 1.5% of a strong organic acid, based on the weight of the grain, is added to the alkyd just prior to mixing the sized refractory mixture with the alkyd resin.

* * * * *